July 23, 1929.  K. FREY  1,722,135
GLAND FOR MACHINE SHAFTS
Filed Feb. 17, 1926
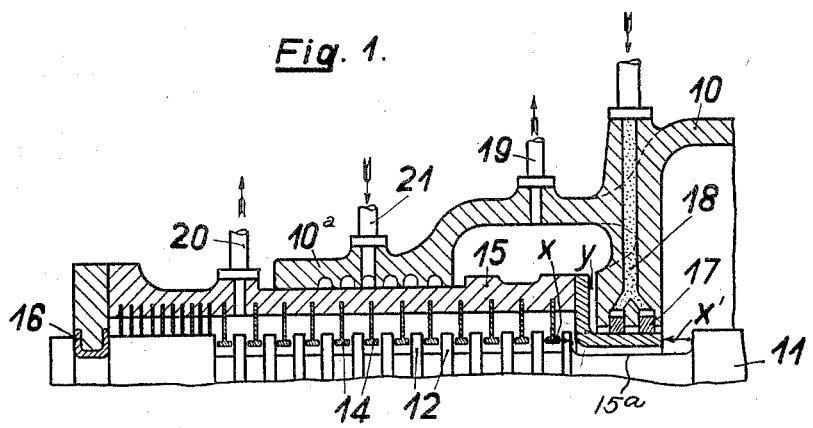
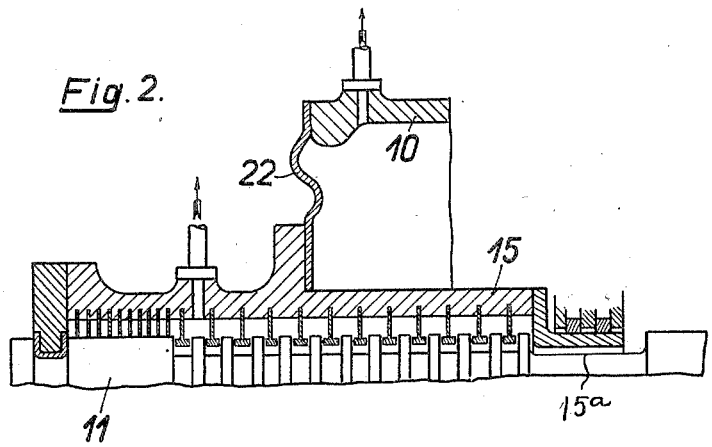
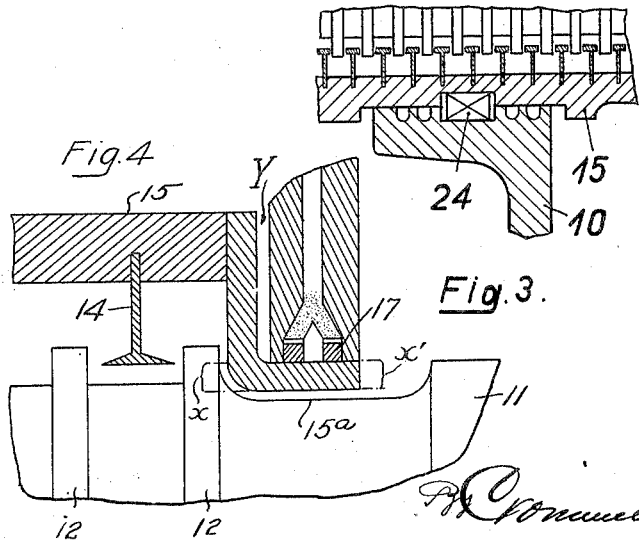

Patented July 23, 1929.

1,722,135

UNITED STATES PATENT OFFICE.

KARL FREY, OF ENNETBADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND.

GLAND FOR MACHINE SHAFTS.

Application filed February 17, 1926, Serial No. 88,964, and in Germany February 21, 1925.

This invention relates to glands utilized to close pressure chambers, such as those of turbines, around the shaft. It pertains particularly to glands of the labyrinth type.

The general object of the invention is the provision of a gland which will allow desired axial movement of the shaft without danger to the labyrinth structure.

A particular object is the provision of a construction which will permit construction of the labyrinth with very small clearances between the relatively movable elements which are depended on to effect the seal.

Another specific object is the provision of a construction which will prevent displacement of the gland by fluid pressures from the chamber.

A further object is the provision of a construction which will relieve the shaft and thrust supporting elements of excessive thrust pressures.

Other and further objects will be indicated or pointed out hereinafter or obvious to one skilled in the art upon an understanding of the present disclosure.

In the drawing forming a part of this specification I show various embodiments of the invention, but it is to be understood that the invention as claimed is not limited to these forms. In said drawing, Fig. 1 is a part sectional elevation of one end of a turbine casing showing the gland and a portion of the shaft.

Fig. 2 is a similar sectional elevation showing an arrangement for retaining the gland against rotation, and Fig. 3 is a detail showing another arrangement for accomplishing a like purpose.

Fig. 4 is a detail on a larger scale of parts shown in Figs. 1 and 2.

In various machines involving the use of a pressure chamber it is necessary to provide glands to seal the chamber around operating shafts. The most general practice in steam turbine construction utilizes a gland arrangement operating on the labyrinth principle. There is necessity for accommodating to a limited extent axial play or expansion of the shaft, but at the same time it is desirable to hold the clearances between the cooperating gland elements as small as possible. The present invention meets the requirements of the situation by providing a gland having axial play with the shaft so controlled that the labyrinh elements on the rotating and non-rotating parts cannot be forced into contact. By reference to the drawing it will be understood that the numeral 10 designates a part of the turbine casing, in which operates the shaft 11 of the rotor. The shaft carries the labyrinth elements 12 which are arranged for cooperation with the elements 14 carried on the shiftable gland housing 15. The latter is mounted for movement in the axial direction in a portion $10^a$ of the casing, in which movement it is held for axial travel with the shaft 11 by a thrust block or collar connection 16 permitting free rotation of the shaft. This connection between the shaft and the gland casing is such as to prevent the labyrinth elements on those members being forced into contact by relative displacement in the axial direction. A suitable packing arrangement is employed between the gland casing and the machine casing 10 to permit the limited axial movement of the former yet prevent leakage. Said seal is preferably on a surface of the gland casing not larger in diameter than the elements 12. The construction of the gland casing is such that the parts exposed to the pressure differential as between the machine chamber pressure and atmosphere are approximately balanced. One way in which this may be accomplished is by setting the casing end of the gland housing into the reduced portion of the shaft as shown at 15a, leaving a clearance there-between so that the chamber pressure is effective on a wall area at $x$ in a direction opposing the pressure effective on the end area $x'$, said areas being approximately equal, an intervening external wall portion being subject to atmospheric pressure as at $y$. This arrangement is shown in detail in Fig. 4. The packing between the gland casing and machine casing may be arranged as at 17, by packing rings permitting the limited axial play of the former. An arrangement may be provided whereby the rings can be pressed upon the shaft by plastic packing material forced through the channel 18. Leakage between the gland casing and machine casing may be vented at 19, and the gland leakage at 20. Grease may be introduced at 21 to lubricate the bearing of the gland casing. To hold the gland casing against rotational creeping, it may be connected to a portion of the machine casing by a laterally flexible disk 22, Fig. 2 which permits the necessary axial play, or by means of a key 24, Fig. 3.

By virtue of the invention, the gland labyrinth may be constructed with very small clearances, since contact of the flanges is positively prevented, and accordingly a more effective gland is obtainable. Furthermore, the thrust block connection at 16 may be made very simple, since it does not have to support a continuous or excessive pressure.

What I claim is:

1. In apparatus having a pressure chamber and rotating shaft, the combination of rotating and stationary gland elements, an axially shiftable housing carrying the stationary elements, a sliding seal between the housing and chamber, said sliding seal having a diameter not larger than that of the rotating gland elements, and means holding the housing for axial movement with the shaft.

2. In apparatus having a pressure chamber and rotating shaft, the combination of rotating and stationary labyrinth gland elements, an axially shiftable housing carrying the stationary elements, a sliding seal between the housing and chamber, a thrust bearing connection between the shaft and housing, said housing presenting an interior end wall area at the end adjacent the pressure chamber in excess of the wall area of the adjacent stationary gland element.

In testimony whereof I have hereunto subscribed my name at Zurich, on the 1st day of February, A. D. 1926.

KARL FREY.